United States Patent
Omagari

(10) Patent No.: US 12,368,192 B2
(45) Date of Patent: Jul. 22, 2025

(54) BATTERY PACK AND ELECTRIC POWER TOOL

(71) Applicant: MURATA MANUFACTURING CO., LTD., Kyoto (JP)

(72) Inventor: Seiji Omagari, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 518 days.

(21) Appl. No.: 17/871,139

(22) Filed: Jul. 22, 2022

(65) Prior Publication Data

US 2022/0359920 A1    Nov. 10, 2022

Related U.S. Application Data

(63) Continuation of application No. PCT/JP2021/000420, filed on Aug. 1, 2021.

(51) Int. Cl.
| | |
|---|---|
| *H01M 10/48* | (2006.01) |
| *H01M 10/42* | (2006.01) |
| *H01M 10/44* | (2006.01) |
| *H01M 50/213* | (2021.01) |
| *H01M 50/258* | (2021.01) |

(52) U.S. Cl.
CPC ......... *H01M 10/48* (2013.01); *H01M 10/425* (2013.01); *H01M 10/44* (2013.01); *H01M 50/213* (2021.01); *H01M 50/258* (2021.01)

(58) Field of Classification Search
CPC ....... B25F 5/00; H01M 10/425; H01M 10/44; H01M 10/48; H01M 2200/103; H01M 50/213; H01M 50/258; Y02E 60/10
See application file for complete search history.

(56) References Cited

U.S. PATENT DOCUMENTS

2014/0242427 A1    8/2014   Tanaka et al.

FOREIGN PATENT DOCUMENTS

| | | |
|---|---|---|
| CN | 102856516 | 1/2013 |
| CN | 105118944 | 12/2015 |
| JP | H11191403 A | 7/1999 |
| JP | 2005197192 | 7/2005 |
| JP | 2008041507 A | 2/2008 |
| JP | 2009231060 A | 10/2009 |
| JP | 2014165102 A | 9/2014 |
| JP | 2017050093 A | 3/2017 |
| JP | 2018190607 A | 11/2018 |
| JP | 2019040700 | 3/2019 |
| JP | 2019040700 A | 3/2019 |
| WO | 2013080567 A1 | 6/2013 |

OTHER PUBLICATIONS

Machine translation CN105118944A (Year: 2015).*
Machine translation JP2005197192A (Year: 2005).*

(Continued)

*Primary Examiner* — Victoria H Lynch

(74) *Attorney, Agent, or Firm* — K&L Gates LLP

(57) ABSTRACT

Provided is a battery pack including a battery; a first circuit board; an outer case; an inner case disposed inside the outer case; and a sensor unit that detects water intrusion, wherein the battery and the first circuit board are housed in the inner case, and the sensor unit is provided between the outer case and the inner case.

13 Claims, 12 Drawing Sheets

(56) References Cited

OTHER PUBLICATIONS

Machine translation JP2019040700A (Year: 2019).*
International Search Report of corresponding PCT application PCT/JP2021/000420, dated Mar. 23, 2021.
Japanese Office Action issued Mar. 14, 2023 in corresponding Japanese Application No. 2021-574586.
Chinese Office Action issued Feb. 21, 2024 in corresponding Chinese Application No. 202180011178.4.
Chinese Office Action issued Aug. 28, 2024 in corresponding Chinese Application No. 202180011178.4.
Chinese Office Action issued Feb. 5, 2025 in corresponding Chinese Application No. 202180011178.4.
Office Action issued in related Chinese Patent Application No. 202180011178.4, mailed on Apr. 21, 2025. 6 pages.

* cited by examiner

A

B

BATTERY PACK AND ELECTRIC POWER TOOL

CROSS REFERENCE TO RELATED APPLICATIONS

The present application is a continuation of PCT patent application no. PCT/JP2021/000420, filed on Jan. 8, 2021, which claims priority to Japanese patent application no. JP2020-010481, filed on Jan. 27, 2020, the entire contents of which are being incorporated by reference.

BACKGROUND

The present application relates to a battery pack and an electric power tool.

There is a possibility that migration or short circuit occurs due to intrusion of liquid such as moisture into a battery pack. In view of this, there has been proposed a battery pack that is provided with a countermeasure against water intrusion.

For example, a technique is described for preventing water intrusion by employing a double structure as an internal structure. Furthermore, a technique is described for improving safety of a battery by detecting intrusion of liquid into a case.

The present application relates to a battery pack and an electric power tool.

However, the first technique described above is a technique for protecting a connector portion by employing a double structure as the connector portion, and is insufficient as a technique for protecting a battery cell from water intrusion. In addition, in the second technique described above, a battery cell is immersed in water at a time of detection of water intrusion, and therefore the is insufficient as a technique for achieving safety of a battery.

Therefore, the present application relates to providing a battery pack and an electric power tool that further improve safety against water intrusion according to an embodiment.

The present application, in an embodiment, provides a battery pack including:
a battery;
a first circuit board;
an outer case;
an inner case disposed inside the outer case; and
a sensor unit that detects water intrusion, wherein
the battery and the first circuit board are housed in the inner case, and
the sensor unit is provided between the outer case and the inner case. The present application also provides an electric power tool including the battery pack described above according to an embodiment.

According to an embodiment of the present application, safety of a battery pack against water intrusion can be further improved. Note that the contents of the present application are not to be construed as being limited by the effects exemplified herein.

DETAILED DESCRIPTION

Hereinafter, the present application will be described in further detail including with reference to the drawings according to an embodiment.

Specific and preferred examples of the present application will be described in further details according to an embodiment, and the content of the present application is not limited thereto.

A battery pack according to an embodiment has a double structure including an outer case (also referred to as an exterior case or the like) and an inner case (also referred to as an inner layer case or the like) housed in the outer case. The battery cell is housed in the inner case. When water intrusion into the battery pack is detected by a water intrusion detection sensor that is provided between the outer case and the inner case and detects water intrusion, output of the battery pack is cut off by a control system in the inner case into which no water has intruded. As a result, protection against migration of the battery cell itself and short circuit of the battery cell is achieved.

Figure 1:
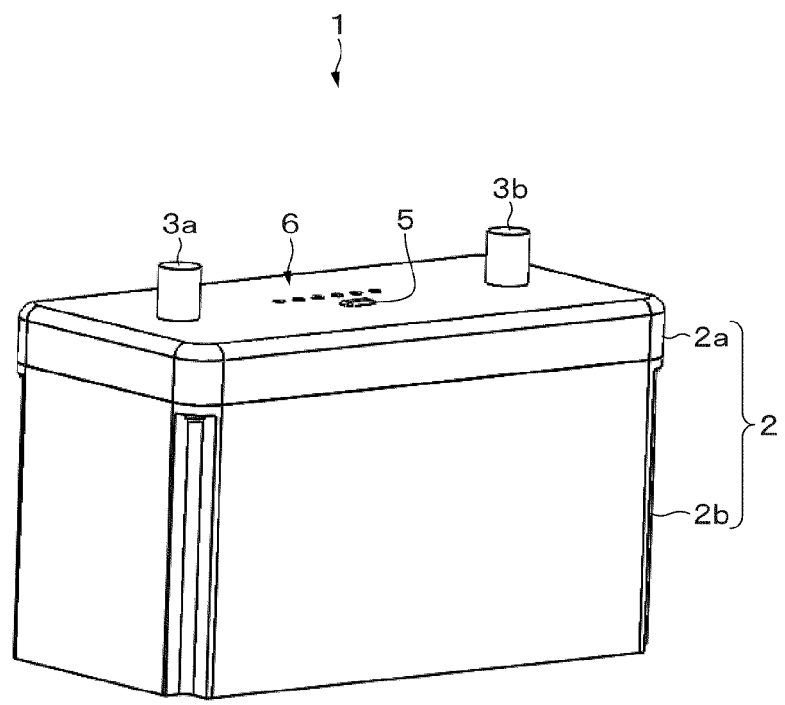
FIG. 1 is a diagram illustrating an example of outer appearance of a battery pack according to an embodiment.

FIG. 1 is a diagram illustrating an example of outer appearance of a battery pack (battery pack 1) according to an embodiment. The battery pack 1 is formed of a resin or the like, and includes an outer case 2 having a box shape as a whole. The outer case 2 includes an outer upper case 2a and an outer lower case 2b. A positive output terminal 3a and a negative output terminal 3b are led out from an upper surface of the outer upper case 2a. The outer upper case 2a is provided with an operation unit 5 and a display unit 6 indicating a state of a battery. The operation unit 5 is configured to enable operation from an outside, and includes, for example, a power switch, which will be described later. The display unit 6 includes, for example, a plurality of light emitting diodes (LEDs). For example, when the power switch is pressed, a predetermined number of LEDs are lit according to a remaining battery level of the battery pack 1 (an example of the state of the battery). Needless to say, the contents of the operation unit 5 and the display unit 6 are not limited to the above examples.

Figure 2:
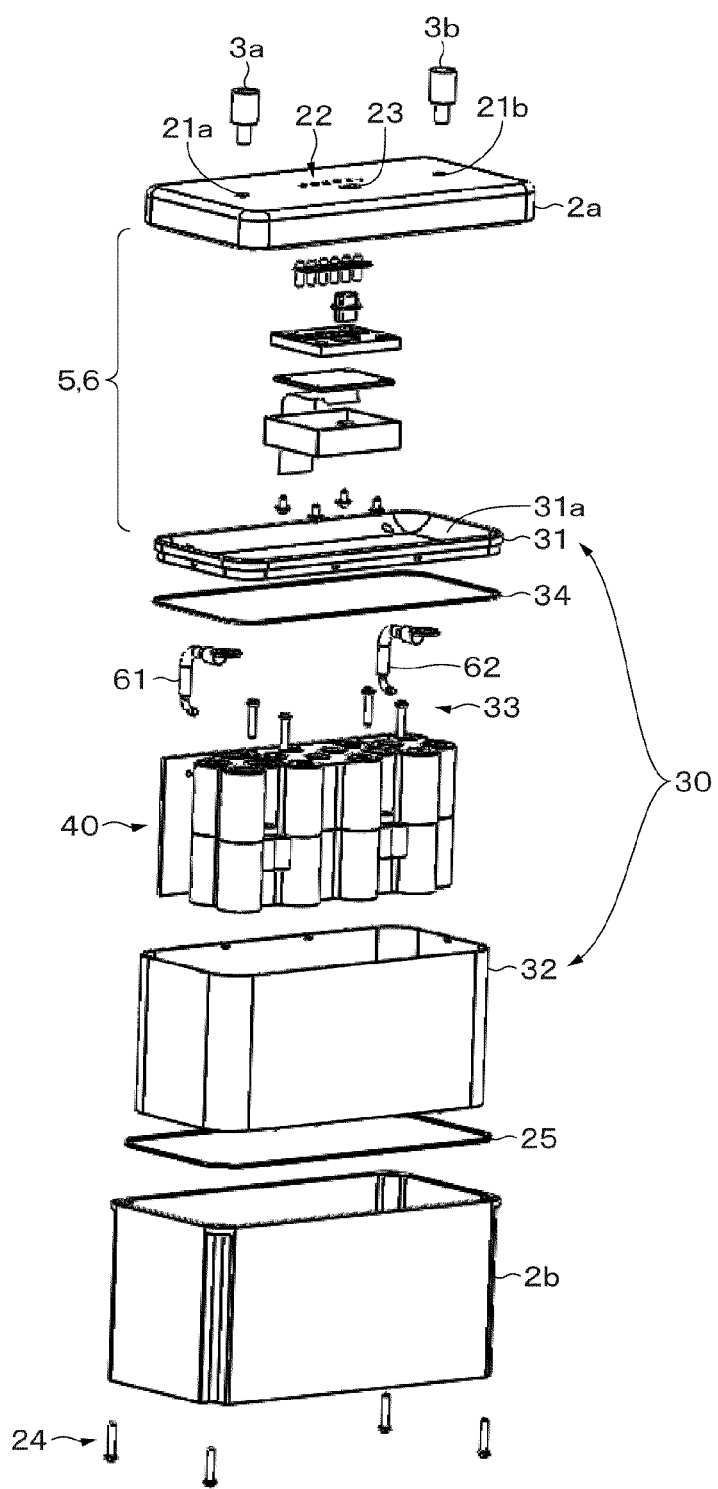
FIG. 2 is a diagram to be referred to when an example of an internal configuration of the battery pack according to the embodiment is described.
Figure 3:
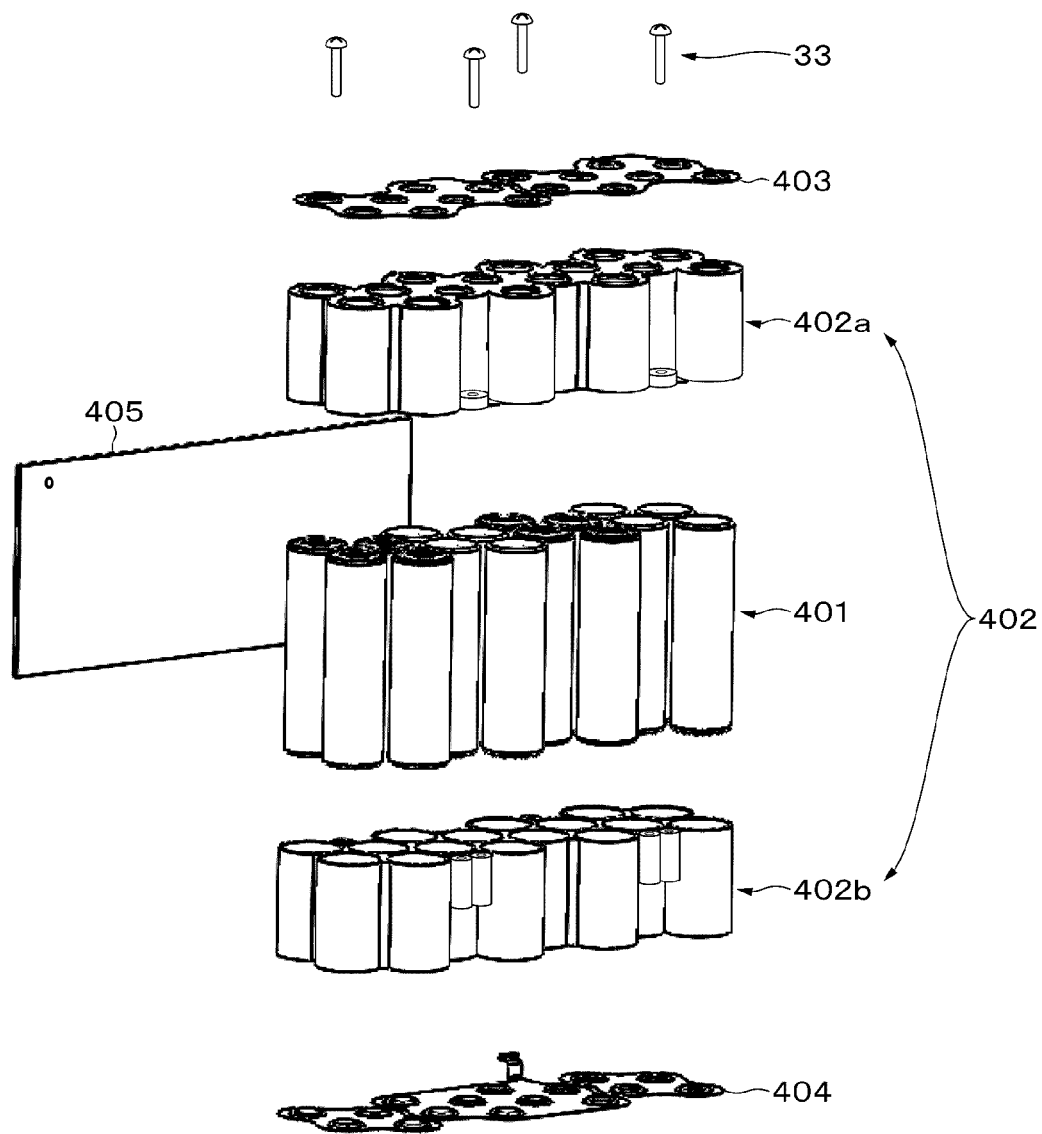
FIG. 3 is a diagram to be referred to when an example of an internal configuration of the battery pack according to the embodiment is described.
Figure 4:
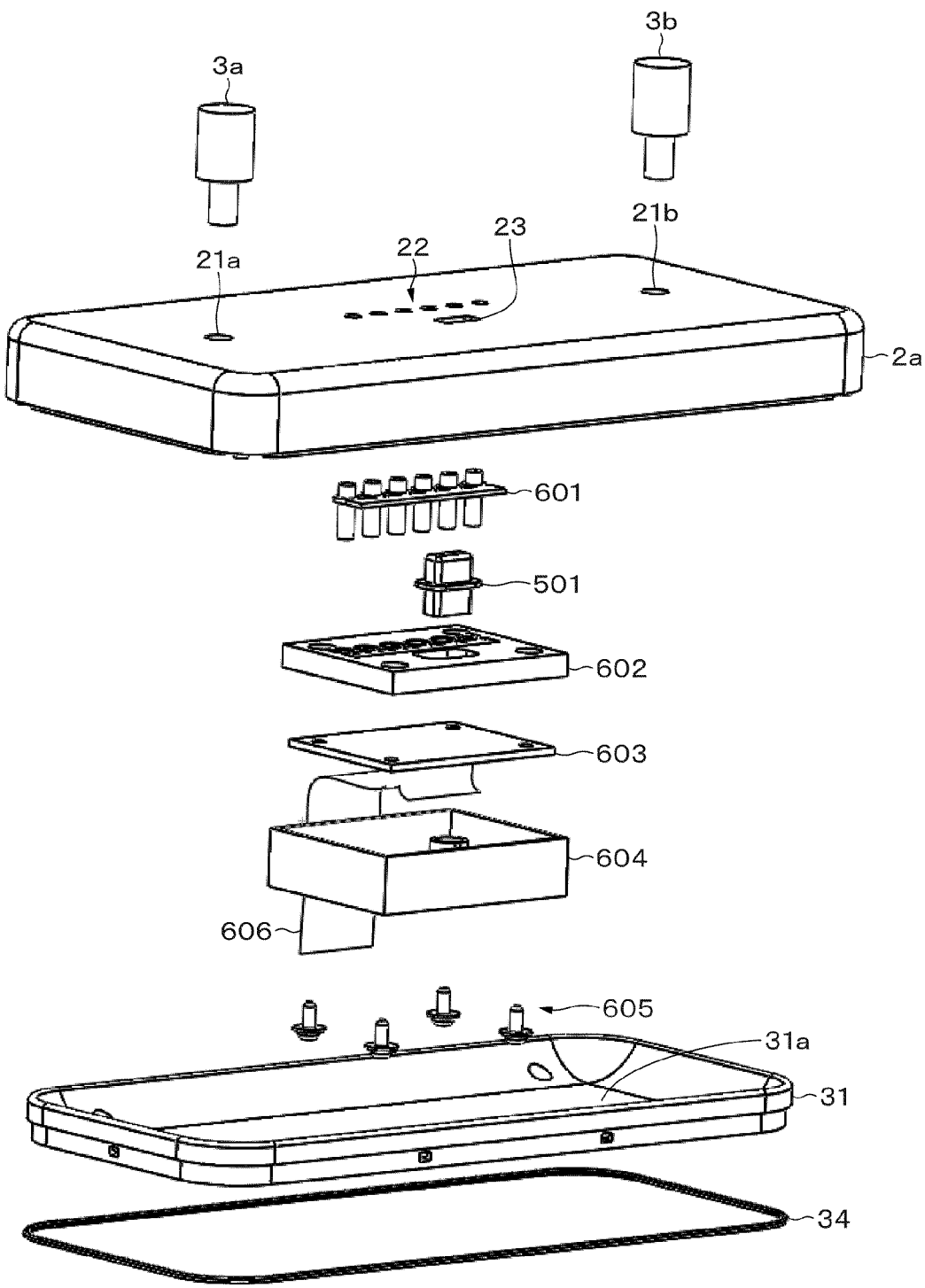
FIG. 4 is a diagram to be referred to when an example of an internal configuration of the battery pack according to the embodiment is described.
Figure 5:
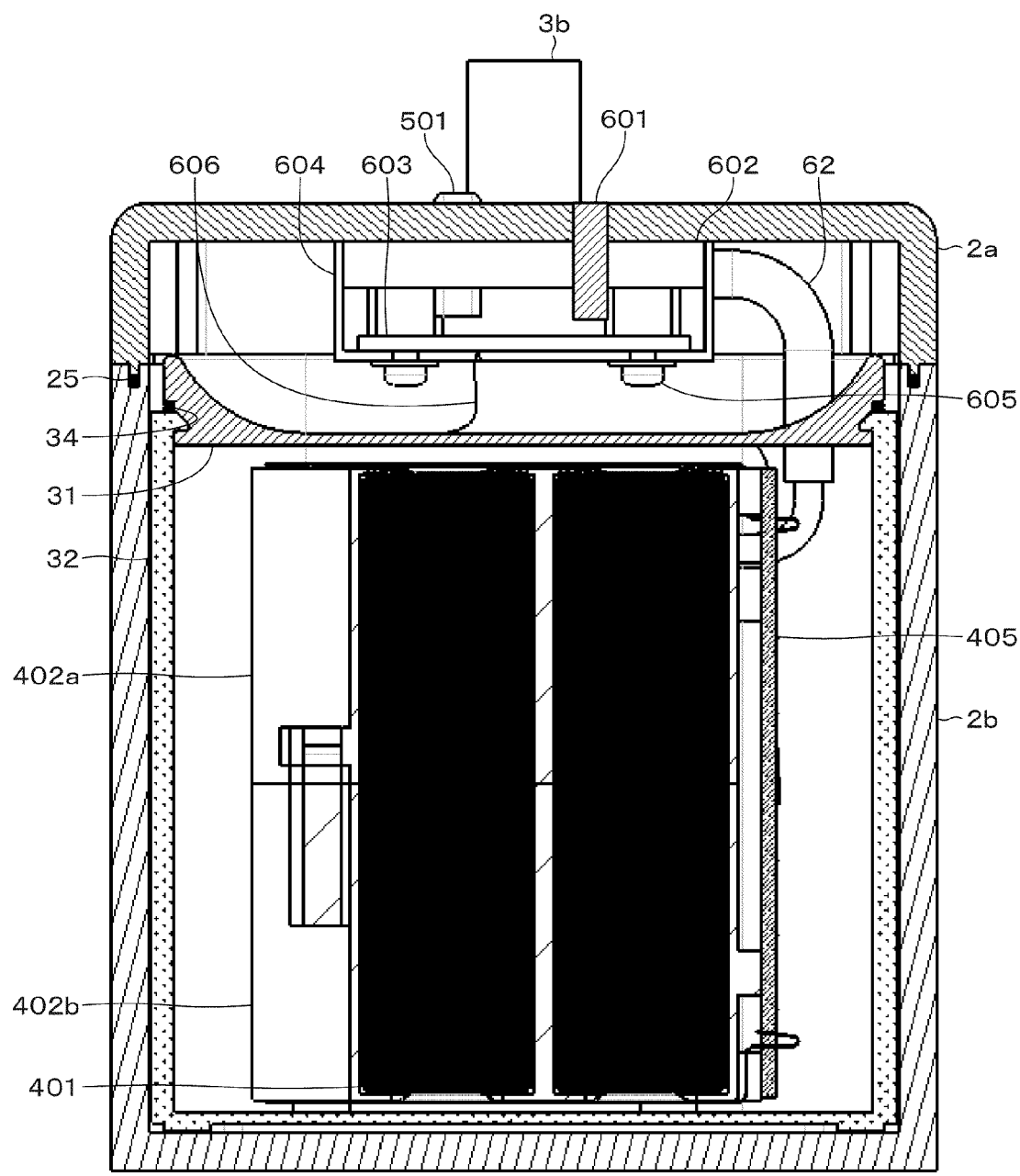
FIG. 5 is a diagram to be referred to when an example of an internal configuration of the battery pack according to the embodiment is described.

Next, an example of an internal configuration of the battery pack 1 will be described with reference to FIGS. 2 to 5. FIG. 2 is an exploded perspective view of an internal configuration of the battery pack 1, FIGS. 3 and 4 are exploded perspective views of an internal configuration of a part of the battery pack 1, and FIG. 5 is a sectional view of the internal configuration viewed from one side surface of the battery pack 1.

As described above, the outer case 2 includes the outer upper case 2a and the outer lower case 2b. The outer upper case 2a has a circular hole 21a into which the positive output terminal 3a is inserted and a circular hole 21b into which the negative output terminal 3b is inserted. Furthermore, the outer upper case 2a has a hole 22 into which an LED lens, which will be described later, is inserted and a hole 23 into which the power switch is inserted.

The outer upper case 2a and the outer lower case 2b are integrated by, for example, fastening screws 24 including four screws. For example, the outer upper case 2a and the outer lower case 2b are integrated by fastening the fastening screws 24 near corners of the outer upper case 2a and the outer lower case 2b. An O-ring 25 formed of an elastic member and having a frame shape is interposed between the outer upper case 2a and the outer lower case 2b. This allows the inside of the outer case 2 to be sealed, thereby improving a waterproof property of the inside of the outer case 2.

An inner case 30 made of a resin or the like is disposed and housed in the outer case 2. The inner case 30 includes an inner upper case 31 and an inner lower case 32. The inner upper case 31 and the inner lower case 32 are integrated by, for example, fitting a claw-like protrusion provided on the inner upper case 31 into a recess of the inner lower case 32 (illustration of these members is omitted.). Fastening screws 33 integrates an upper battery holder and a lower battery holder, which will be described later. An O-ring 34 formed of an elastic member and having a frame shape is interposed between the inner upper case 31 and the inner lower case 32. This allows the inside of the inner case 30 of the battery pack 1 to be sealed, thereby improving a waterproof property of the inside of the inner case 30. The O-ring is a member formed of a ring-shaped elastic resin. As described above, the outer case 2 and the inner case 30 each independently have a sealed structure. The inner upper case 31 has a recess 31a that is recessed downward. The recess 31a is located in a space between the outer case 2 and the inner case 30.

A cell assembly 40 is housed in the inner case 30. As illustrated in FIG. 3, the cell assembly 40 includes a battery 401, a cell holder 402, a tab 403, a tab 404, and a first circuit board 405. The battery 401 has one or a plurality of cylindrical battery cells. In an embodiment, the battery 401 has 16 battery cells. Needless to say, the number of battery cells and a manner in which the battery cells are connected can be changed as appropriate. The cell holder 402 is a holder that houses and holds the battery cells. The cell holder 402 according to an embodiment includes an upper cell holder 402a and a lower cell holder 402b, and the upper cell holder 402a and the lower cell holder 402b are integrated with fastening screws 33, and thereby the battery 401 is housed and held by the cell holder 402. The tabs 403 and 404 are metal plates welded to a positive terminal or a negative terminal of the battery 401. On the first circuit board 405, an integrated circuit (IC) or the like for control or the like for ensuring safety of the battery 401 is mounted. An output of the battery 401 is supplied to the positive output terminal 3a through an output line 61 (see FIGS. 2 and 5), and is supplied to the negative output terminal 3b through an output line 62.

As illustrated in FIG. 4, the operation unit 5 includes a power switch 501. The power switch 501 is inserted into the hole 23. The display unit 6 includes an LED lens 601, a lens waterproofing rubber 602, an LED substrate 603 (an example of a second circuit board) which is an example of a circuit board, an LED substrate holder 604, an LED substrate fastening screw 605, a flexible substrate 606 which is a flexible printed circuit (FPC), and an LED element (not illustrated) mounted on the LED substrate 603.

The LED lens 601 is inserted into the hole 22 of the outer upper case 2a. Light of the LED element mounted on the LED substrate 603 is guided to the upper surface of the outer upper case 2a through the LED lens 601. The lens waterproofing rubber 602 is disposed around the LED lens 601 and the power switch 501 to prevent intrusion of water into the LED substrate holder 604. The LED substrate 603 is a substrate on which the LED element, an IC that controls light emission of the LED lens 601, and the like are mounted. Furthermore, the LED substrate 603 is provided with a terminal to be connected when the power switch 501 is pressed, and is configured such that when the power button 501 is pressed, electrical conduction is established and the LED element emits light. The LED substrate holder 604 has a box shape, and holds the LED substrate 603 on a bottom surface side of the inside thereof. For example, the LED substrate 603 is held by the LED substrate holder 604 by fastening the LED substrate fastening screws 605 including four screws near corners of the LED substrate 603 and the LED substrate holder 604. One end side of the flexible substrate 606 is connected to the LED substrate 603. The flexible substrate 606 is drawn out from the bottom surface of the LED substrate holder 604, and the other end side thereof is connected to the first circuit board 405. With such a configuration, a space sectioned by the LED substrate holder 604 is formed in the space between the outer case 2 and the inner case 30, as illustrated in FIG. 5.

The battery pack 1 includes one or a plurality of water intrusion detection sensors as a sensor unit. The water intrusion detection sensor is disposed in the space between the outer case 2 and the inner case 30. In the present embodiment, two water intrusion detection sensors (water intrusion detection sensor 80a and 80b) are disposed in the space between the outer case 2 and the inner case 30. In order to effectively and accurately detect water intrusion into the battery pack 1 by the water intrusion detection sensors, it is effective to dispose the water intrusion detection sensors at a place where moisture is likely to be stored in the space between the outer case 2 and the inner case 30.

Figure 6:
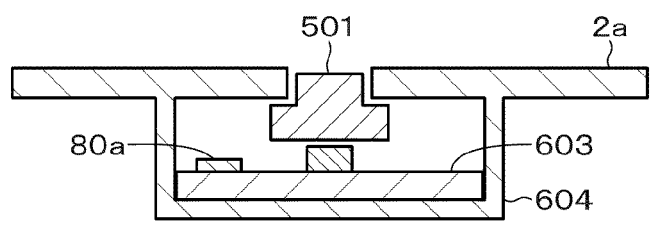
FIG. 6 includes diagrams A and B to be referred to when an example of a position of a water intrusion detection sensor according to the embodiment is described.
Figure 6:
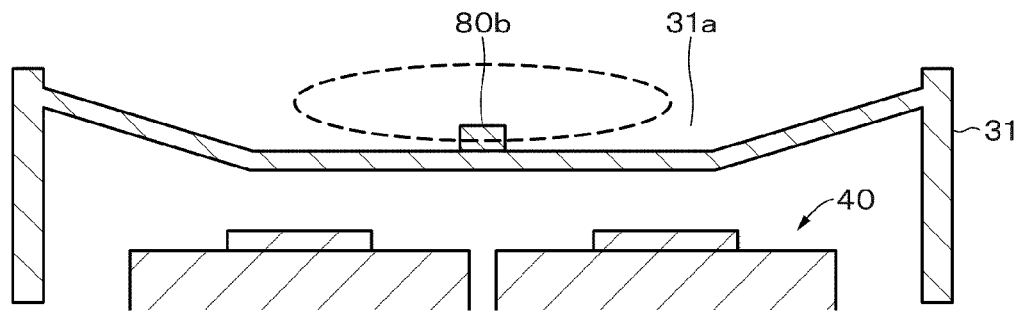

FIG. 6A is a diagram illustrating a specific example of a position of the water intrusion detection sensor 80a. In FIGS. 6A and 6B, illustration of some constituent elements is simplified. As illustrated in FIG. 6A, when the power switch 501 is pressed, a slight gap is generated between the power switch 501 and the outer upper case 2a. There is a possibility that moisture intrudes through the gap. The moisture that has intruded is stored in the LED substrate holder 604. In view of this, the water intrusion detection sensor 80a is disposed close to the operation unit 5 and the display unit 6. Specifically, the water intrusion detection sensor 80a is disposed on the LED substrate 603 to which the power switch 501 and the LED element are connected. With such an arrangement, it is possible to efficiently detect water intrusion into the space between the outer case 2 and the inner case 30.

In an embodiment, the recess 31a is formed on the upper surface of the inner upper case 31. Since the recess 31a is formed, moisture intruding through the outer case 2 can be stored close to the bottom of the recess 31a. That is, the recess 31a can function as a storage portion that stores moisture. By providing the water intrusion detection sensor 80b close to the recess 31a, specifically, close to the bottom of the recess 31a, it is possible to efficiently detect water intrusion into the space between the outer case 2 and the inner case 30.

Needless to say, the water intrusion detection sensor may be disposed at any one of these positions or may be disposed at both of these positions. Furthermore, the water intrusion detection sensor may be disposed at another position. For example, the water intrusion detection sensor may be provided on the flexible substrate 606 that is drawn out from the inside of the LED substrate holder 604 and disposed in the space between the outer case 2 and the inner case 30.

Figure 7:
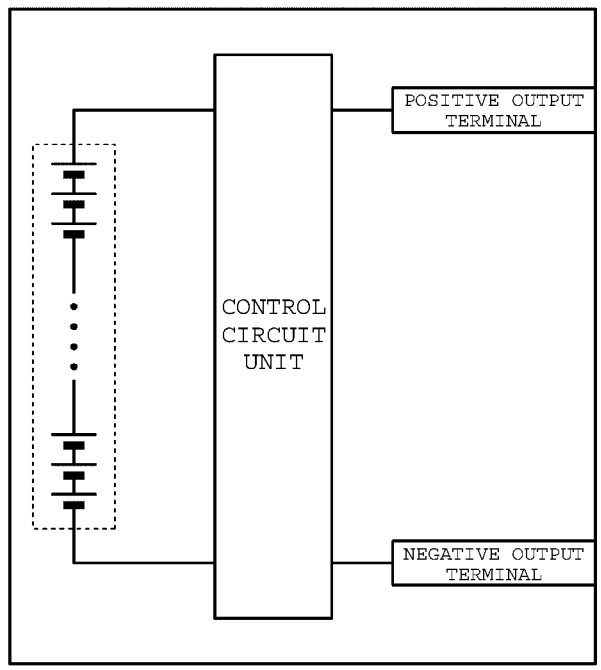
FIG. 7 includes diagrams A and B to be referred to when an example of an electric configuration of the battery pack according to the embodiment is described.
Figure 7:
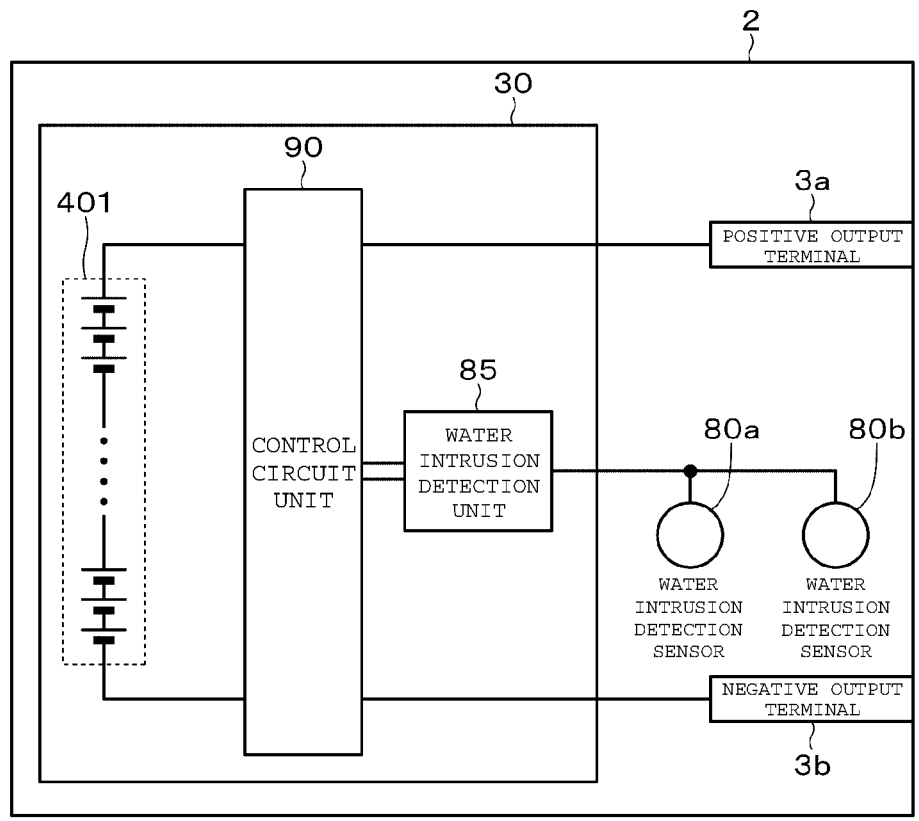

FIG. 7A is a diagram illustrating an example of an electrical configuration of a general battery pack. In a general battery pack, a battery and a control circuit unit are disposed in a single case, and a positive output terminal and a negative output terminal are led out from the case.

Figure 8:
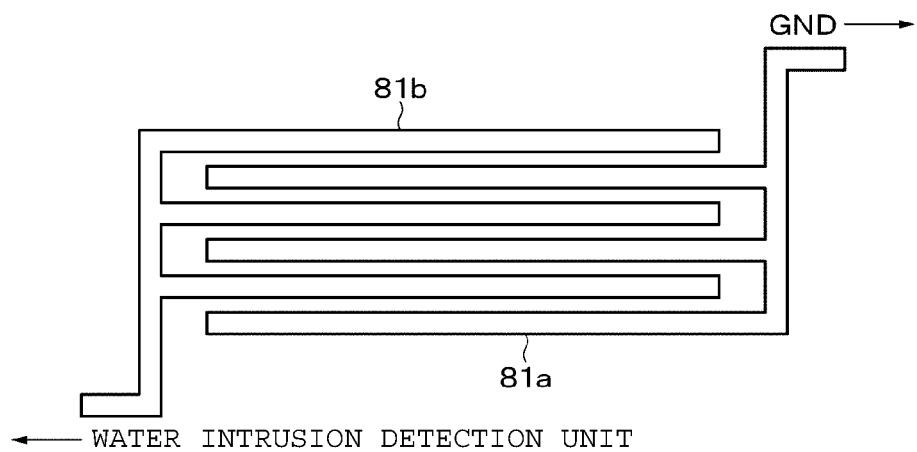
FIG. 8 is a diagram illustrating an example of a configuration of the water intrusion detection sensor according to the embodiment.

FIG. 7B is a diagram illustrating an example of an electric configuration of the battery pack 1. In the battery pack 1 according to an embodiment, the positive output terminal 3a and the negative output terminal 3b are led out from the outer case 2. The water intrusion detection sensor is disposed in the space between the outer case 2 and the inner case 30. For example, the water intrusion detection sensors 80a and 80b are provided between the outer case 2 and the inner case 30. FIG. 8 is a diagram illustrating an example of the water intrusion detection sensor 80a (or the water intrusion detection sensor 80b). For example, the water intrusion detection sensor 80a is configured such that two comb-shaped wiring patterns 81a and 81b face each other. A distance between adjacent wiring patterns is preferably about 0.5 mm.

In the inner case 30, a water intrusion detection unit 85 electrically connected to the water intrusion detection sensors 80a and 80b and a control circuit unit 90 are provided. The water intrusion detection unit 85 and the control circuit unit 90 are mounted on the first circuit board 405.

Figure 9:
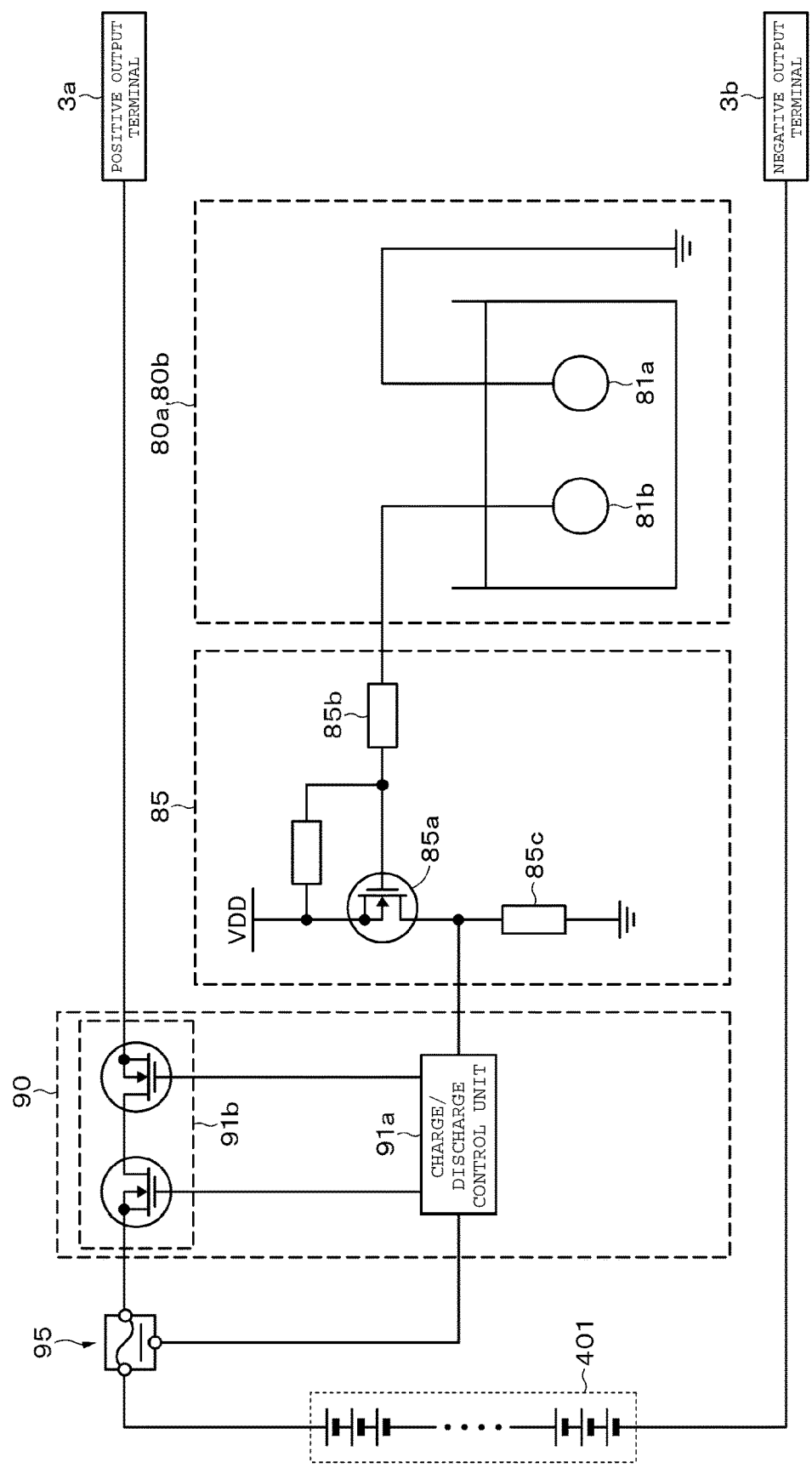
FIG. 9 is a diagram to be referred to when an example of an electric configuration of the battery pack according to the embodiment is described.

FIG. 9 is a diagram illustrating details of the example of the electric configuration of the battery pack 1. The water intrusion detection sensors 80a and 80b are electrically connected to the water intrusion detection unit 85. The water intrusion detection unit 85 includes a field effect transistor (FET) 85a connected between a predetermined voltage VDD and the ground, a resistor 85b connected between a gate of the FET 85a and the water intrusion detection sensors 80a and 80b, and a resistor 85c connected between the FET 85a and the ground. The control circuit unit 90 includes a charge/discharge control unit 91a that controls charge and discharge of the battery 401, and a charge/discharge switch 91b (for example, two FETs) whose on/off is controlled by the charge control unit 91a. The charge/discharge control unit 91a is connected between the FET 85a and the resistor 85c in the water intrusion detection unit 85. The charge/discharge switch 91b may be connected not to a positive side power line of the battery 401, but to a negative side power line of the battery 401. Furthermore, the water intrusion detection unit 85 and the control circuit unit 90 may be provided for each water intrusion detection sensor.

Furthermore, to the positive side power line of the battery 401, a self control protector (SCP) 95, which is an example of a heater-equipped fuse, is connected in series with the charge/discharge switch 91b. The SCP 95 can be fused at any timing by the charge/discharge control unit 91a.

Next, an example of operation of the battery pack 1 will be described. In the battery pack 1, control for cutting off the output of the battery pack 1 is performed in a case where water intrusion into the space between the outer case 2 and the inner case 30 is detected by at least one of the water intrusion detection sensor 80a and the water intrusion detection sensor 80b.

An example of basic operation will be specifically described. When there is no water intrusion, for example, the electrical connection of the wiring patterns 81a and 81b is opened, and a high (Hi) signal is supplied to the gate of the FET 85a. When there is water immersion, the water intrusion detection sensor 80a (or the water intrusion detection sensor 80b) becomes conductive, a low (Lo) signal is supplied to the gate of the FET 85a, and the FET 85a is turned on. When the FET 85a is turned on, a level of input to the charge/discharge control unit 91a is switched, and the presence of the water intrusion is transmitted from the water intrusion detection unit 85 to the control circuit unit 90 by this switching. The charge/discharge control unit 91a recognizes that the water intrusion has occurred by detecting the switching of the level of the input. Then, the charge/discharge control unit 91a turns off the charge/discharge switch 91b to cut off the output of the battery pack 1. Since the charge/discharge control unit 91a is disposed inside the inner case 30, the charge/discharge control unit 91a is operable in a case where the waterproof mechanism of the outer case 2 breaks down and there is water intrusion into the space between the outer case 2 and the inner case 30, and thus can reliably cut off the output of the battery pack 1.

Figure 10:
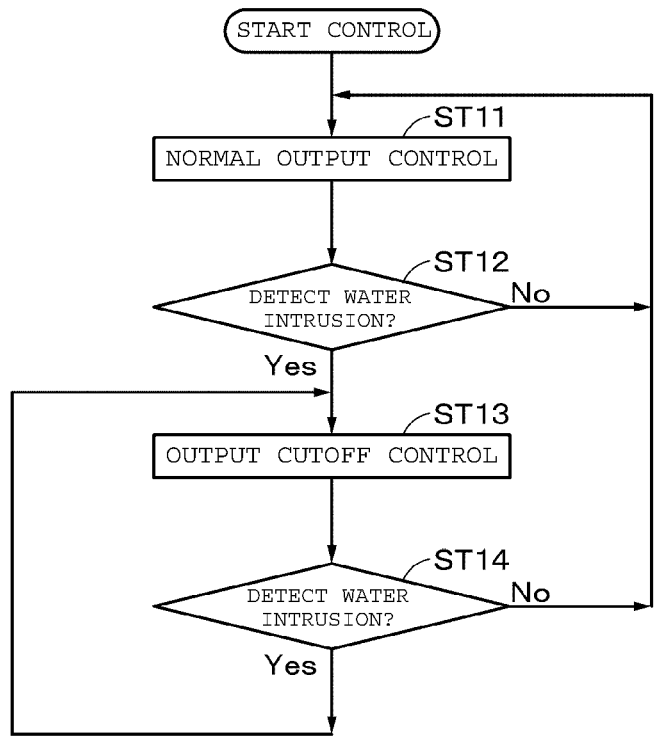
FIG. 10 is a flowchart to be referred to when a first operation example of the battery pack according to the embodiment is described.

Next, a first operation example of the battery pack 1 will be described with reference to the flowchart of FIG. 10. In the first operation example, in a case where water intrusion into the space between the outer case 2 and the inner case 30 of the battery pack 1 is detected, the output of the battery pack 1 is cut off, and in a case where moisture is discharged from the space between the outer case 2 and the inner case 30 (water removal), the output of the battery pack 1 is restored.

When the control is started, in step ST11, the charge/discharge control unit 91a performs normal output control for outputting power of the battery pack 1 by performing control for turning on a discharge switch of the charge/discharge switch 91b and turning off a charge switch of the charge/discharge switch 91b. Then, the processing proceeds to step ST12.

In step ST12, sensing data of the water intrusion detection sensors 80a and 80b is supplied to the charge/discharge control unit 91a via the water intrusion detection unit 85, and thereby the charge/discharge control unit 91a determines whether there is water intrusion into the space between the outer case 2 and the inner case 30. In a case where the charge/discharge control unit 91a determines that there is no water intrusion, the processing returns to step ST11, and the normal output control is continued. In a case where the charge/discharge control unit 91a determines that there is water intrusion, the processing proceeds to step ST13.

In step ST13, the charge/discharge control unit 91a performs output cutoff control for turning off the charge/discharge switch 91b. By this control, the output of the battery pack 1 is cut off. Then, the processing proceeds to step ST14.

In step ST14, after determining that there is water intrusion into the space between the outer case 2 and the inner case 30, the charge/discharge control unit 91a determines again whether there is water intrusion into the space between the outer case 2 and the inner case 30 after elapse of a predetermined time. In a case where the charge/discharge control unit 91a determines again in this determining process that there is water intrusion, the processing returns to step ST13, and the output cutoff control is continued. In a case where the charge/discharge control unit 91a determines in the determining process in step ST14 that there is no water intrusion, the processing returns to step ST11.

In step ST11, the charge/discharge control unit 91a performs control for turning on the discharge switch of the charge/discharge switch 91b. As a result, the output of the battery pack 1 that was cut off once is restored, and the power of the battery pack 1 is supplied to a load.

Figure 11:
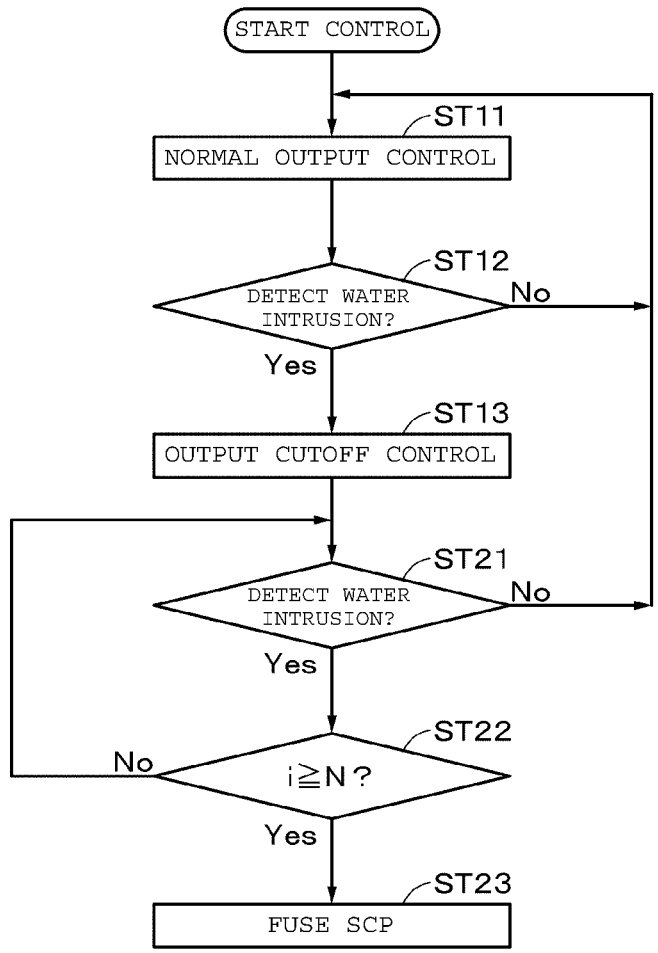
FIG. 11 is a flowchart to be referred to when a second operation example of the battery pack according to the embodiment is described.

Next, a second operation example of the battery pack 1 will be described with reference to the flowchart of FIG. 11. Note that operations in steps ST11 to ST13 are identical to those of the first operation example, and therefore repeated description thereof will be omitted as appropriate.

After the output cutoff control is performed in step ST13, the charge/discharge control unit 91a determines whether there is water intrusion every predetermined time in step ST21. In a case where it is determined that there is no water intrusion, the processing returns to step ST11, and the normal output control is performed. In a case where it is determined in the determining process in step ST21 that there is water intrusion, the processing proceeds to step ST22.

In step ST22, the charge/discharge control unit 91a determines whether or not the number i of times of determination that there is water intrusion is a predetermined number N or more. In a case where i is less than N, the processing returns to step ST21, and the determining process in step ST21 is performed again. In a case where i is N or more, the processing proceeds to step ST23.

In step ST23, the charge/discharge control unit 91a fuses the SCP 95 by transmitting a fusing signal to the SCP 95. When the SCP 95 is fused, the battery pack 1 shift to a state in which the power of the battery pack 1 is not output to the outside, that is, a state in which output of the power is substantially prohibited unless the SCP 95 is replaced.

According to the second operation example, since the output cutoff control is performed when water intrusion is detected, the safety of the battery pack 1 can be ensured. On the other hand, there is also a possibility that the water intrusion detection sensors 80a and 80b become conductive due to not water intrusion but noise or the like. In a case where the water intrusion detection sensors 80a and 80b become conductive in response to noise or the like, there is a high possibility that the water intrusion detection sensors 80a and 80b become no longer conductive during a plurality of processes of determining the presence or absence of water intrusion, and therefore it is determined in the determining process in step ST21 that there is no water intrusion. On the other hand, in the case of water intrusion, it is determined that there is water intrusion no matter how many times the presence or absence of water intrusion is determined. That is, by appropriately setting the predetermined number N (for example, N=5), it is possible to prevent the output cutoff control from continuing due to external noise, and in the case of water intrusion, it is possible to perform the output cutoff control with certainty, and thereby noise resistance can be enhanced. Furthermore, by fusing the SCP 95, the output of the battery pack 1 can be cut off with certainty.

Note that one of the processing according to the first operation example and the processing according to the second operation example may be performed in the battery pack 1, and either the processing according to the first operation example or the processing according to the second operation example may be settable according to the application of the battery pack 1 or the like.

The battery pack 1 according to an embodiment can be mounted on an electric power tool, an electric vehicle, an electronic device, or the like or can be used to supply electric power.

Figure 12:
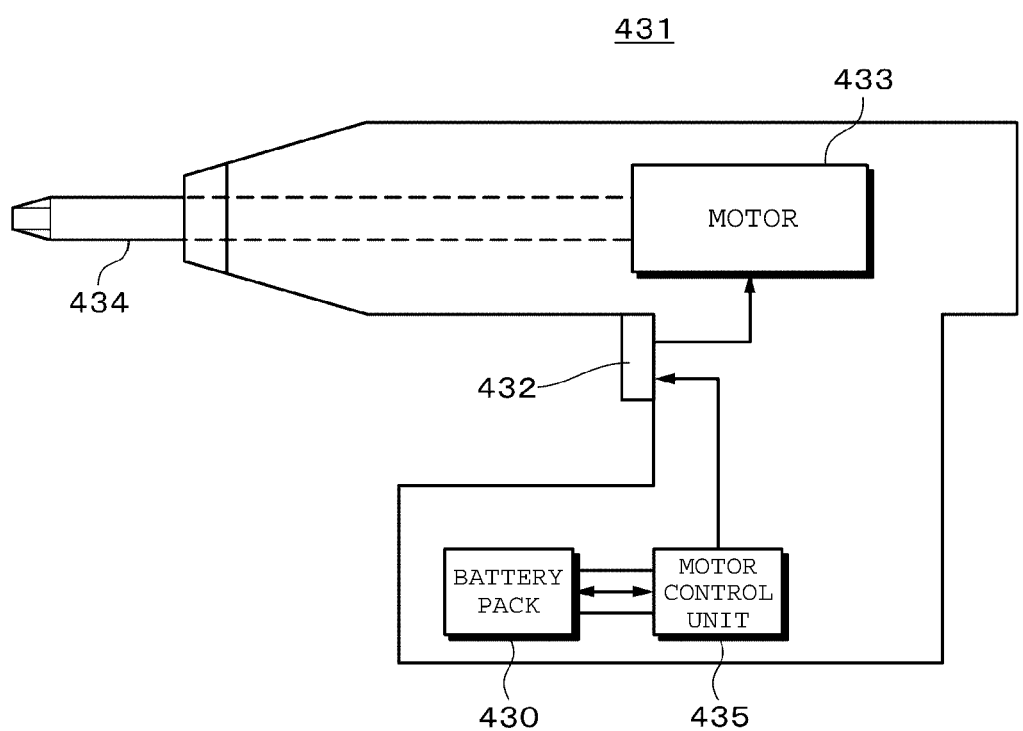
FIG. 12 is a diagram for explaining an application example.

As a specific example, an example of an electric screwdriver will be schematically described as an electric power tool to which the present application can be applied with reference to FIG. 12. An electric screwdriver 431 is provided with a motor 433 that transmits rotational power to a shaft 434 and a trigger switch 432 operated by a user. A battery pack 430 according to an embodiment (e.g., battery pack 1) and a motor control unit 435 are housed in a lower housing of a handle of the electric screwdriver 431. The battery pack 430 is built in the electric screwdriver 431 or is detachably mounted in the electric screwdriver 431.

Each of the battery pack 430 and the motor control unit 435 may be provided with a microcomputer (not illustrated) so that charge/discharge information of the battery pack 430 can be exchanged. The motor control unit 435 can control operation of the motor 433 and cut off power supply to the motor 433 upon occurrence of an abnormality such as overdischarge.

Although the present application has been described herein according to an embodiment, the content of the present application is not limited thereto, and various modifications are possible.

For example, the shape, size, number, and the like of each constituent element of the battery pack can be changed according to an embodiment. As referenced above, the battery pack 1 may include one water intrusion detection sensor or may include three or more water intrusion detection sensors according to an embodiment.

The present application described herein and modifications thereof can be appropriately combined according to an embodiment. Furthermore, the materials, steps, and the like described herein are merely examples, and the contents of the present application are not limited thereto.

DESCRIPTION OF REFERENCE SYMBOLS

1: Battery pack
2: Outer case
5: Operation unit
6: Display unit
25, 34: O-ring
30: Inner case
31a: Recess
80a, 80b: Water intrusion detection sensor
85: Water intrusion detection unit
91a: Charge/discharge control unit
91b: Charge/discharge switch
401: Battery pack
405: First circuit board
603: LED substrate
606: Flexible substrate It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
   a battery;
   a first circuit board;
   an outer case;
   an inner case disposed inside the outer case; and
   a sensor unit that detects water intrusion,
   wherein
   the battery and the first circuit board are housed in the inner case,
   the sensor unit is provided between the outer case and the inner case,
   the outer case is provided with an operation unit that enables an operation from an outside of the battery, and
   the sensor unit is disposed close to the operation unit.

2. The battery pack according to claim 1, wherein the outer case and the inner case each independently have a sealed structure.

3. The battery pack according to claim 1, wherein the first circuit board is provided with a charge/discharge control unit that controls charge and discharge of the battery and a water intrusion detection unit that is electrically connected to the sensor unit and transmits information concerning whether or not water intrusion has been detected to the charge/discharge control unit.

4. The battery pack according to claim 1, wherein an FPC is connected to the first circuit board; and the sensor unit is disposed on the FPC.

5. The battery pack according to claim 1, wherein the sensor unit is a plurality of sensor units.

6. The battery pack according to claim 5, wherein a storage portion in which moisture is stored is provided in a space between the outer case and the inner case; and
   the sensor unit is disposed in the storage portion.

7. The battery pack according to claim 1, further comprising:
   a charge/discharge control unit that controls charge and discharge of the battery; and
   a charge/discharge switch that turns on and off charge and discharge,
   wherein the charge/discharge control unit controls the charge/discharge switch to be turned off in a case where it is determined that there is water intrusion between the outer case and the inner case.

8. The battery pack according to claim 7, wherein after determining that there is water intrusion between the outer case and the inner case, the charge/discharge control unit determines again whether or not there is water intrusion between the outer case and the inner case after elapse of a predetermined time, and controls the charge/discharge switch to be turned on in a case where it is determined that there is no water intrusion.

9. An electric power tool comprising the battery pack according to claim 1.

10. A battery pack comprising:
    a battery;
    a first circuit board;
    an outer case;
    an inner case disposed inside the outer case;
    a sensor unit that detects water intrusion;
    a charge/discharge control unit that controls charge and discharge of the battery; and
    a charge/discharge switch that turns on and off charge and discharge,
    wherein
    the battery and the first circuit board are housed in the inner case,
    the sensor unit is provided between the outer case and the inner case,
    the charge/discharge control unit controls the charge/discharge switch to be turned off in a case where it is determined that there is water intrusion between the outer case and the inner case,
    a heater-equipped fuse is connected in series with the charge/discharge switch,
    after determining that there is water intrusion between the outer case and the inner case, the charge/discharge control unit determines whether or not there is water intrusion a plurality of times every predetermined time, and
    in a case where it is determined that there is water intrusion a predetermined number of times or more, the charge/discharge control unit fuses the heater-equipped fuse by transmitting a fusing signal to the heater-equipped fuse.

11. A battery pack comprising:
    a battery;
    a first circuit board;
    an outer case;
    an inner case disposed inside the outer case; and
    a sensor unit that detects water intrusion,
    wherein
    the battery and the first circuit board are housed in the inner case,
    the sensor unit is provided between the outer case and the inner case,
    the outer case is provided with a display unit that displays a state of the battery, and
    the sensor unit is disposed close to the display unit.

12. A battery pack comprising:
    a battery;
    a first circuit board;
    an outer case;
    an inner case disposed inside the outer case; and
    a sensor unit that detects water intrusion,
    wherein
    the battery and the first circuit board are housed in the inner case,
    the sensor unit is provided between the outer case and the inner case,
    the outer case is provided with an operation unit that enables an operation from an outside and a display unit that displays a state of the battery, and
    the sensor unit is disposed close to the operation unit and the display unit.

13. The battery pack according to claim 12, wherein the sensor unit is disposed on a second circuit board to which the operation unit and the display unit are connected.

* * * * *